S. I. Russell,
Wood Pavement,
N° 77,766.
Patented May 12, 1868.
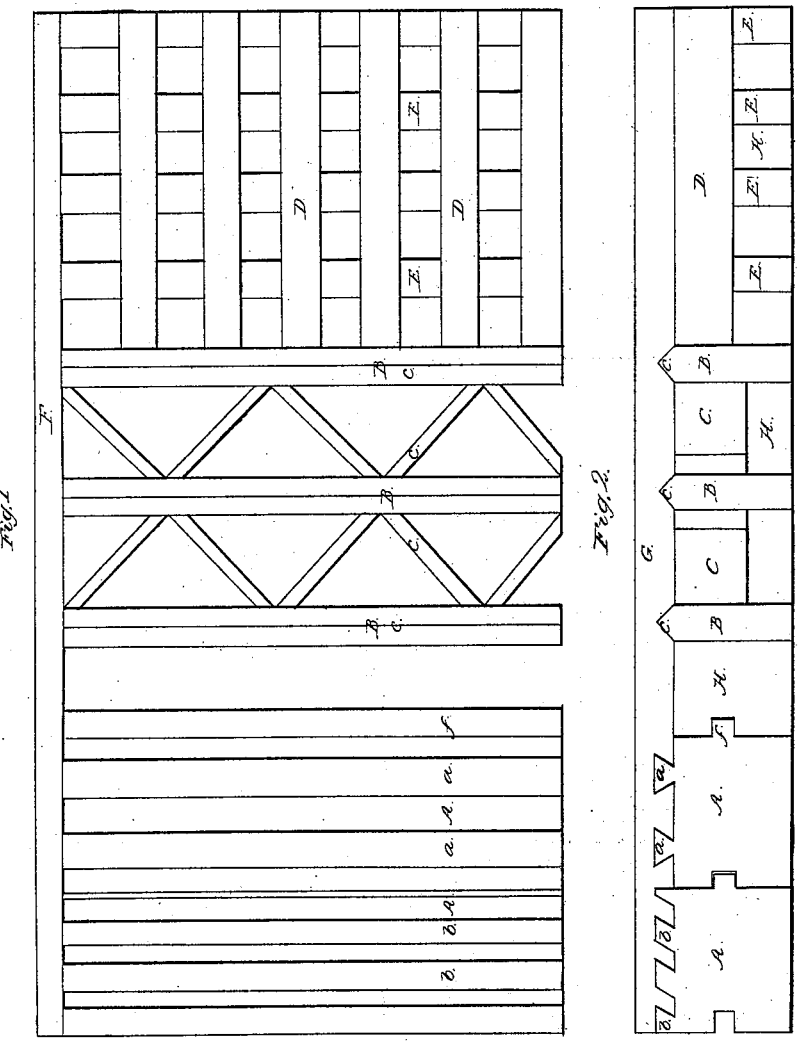

United States Patent Office.

SAMUEL I. RUSSELL, OF CHICAGO, ILLINOIS.

Letters Patent No. 77,766, dated May 12, 1868.

IMPROVED SIDEWALKS.

*The Schedule referred to in these Letters Patent and making part of the same.*

TO ALL WHOM IT MAY CONCERN:

Be it known that I, SAMUEL I. RUSSELL, of the city of Chicago, in the county of Cook, and State of Illinois, have invented certain new and useful Improvements in Sidewalks; and I do hereby declare that the following is a full, clear, and exact description thereof, reference being had to the accompanying drawings, making a part of this specification, in which—

Figure 1 represents a plan or top view of three varieties of foundation or substructure, marked A, B, and D, and Figure 2 a cross-section of the same as completed.

Like letters refer to the same parts in all of the figures.

The nature of my invention consists in constructing sidewalks and other walks and ways with a wooden foundation or substructure, constituting the principal portion of the walk or way; in anchoring the concrete, mastic, asphaltum, or other substance used, to such prepared foundation, and in so combining the wood and the concrete that the completed walk or way will have the strength of wood and the durability of asphaltum, and be completely water-proof.

Wooden sidewalks have long been used, but they are objectionable, for the reasons that they are not durable, and are water-proof only when constructed with great care and expense and kept in perfect repair.

Sidewalks constructed entirely of concrete, or of prepared coal-tar or asphaltum, have also been used, but they are liable to crack, and are not of sufficient strength to be used where the sidewalk is vaulted or the earth beneath them excavated.

My invention aims to combine the good qualities of both kinds without their defects.

To enable others skilled in the art to make my improved sidewalk, I will describe its construction.

On preparing the foundation, as shown at A, figs. 1 and 2, I use joist, scantling, plank, or boards of any suitable thickness for the required strength, and join them together, by tongueing and grooving, or otherwise, so as to make them sufficiently strong for handling.

I make the walks in sections, each section being in length the same as the completed walk is in width, and in width from two to four feet, more or less, as may be desired. I place a frame around the section thus prepared, which projects above sufficiently to hold the composition. The composition is heated and poured on, so as to fill the frame, when it is sprinkled with fine gravel or coarse sand, and rolled or pressed, so as to form an even surface. When cooled, the frame is removed, and the section is ready for laying in place. When the sections are laid, the seams or joints are filled with the same composition, so as to make the walk water-tight. The composition in this form of foundation is anchored or fastened to it by means of bevelled slats $a$, inserted so as to form dove-tailed grooves, or inclined slats or strips $b$, nailed to the planks or formed on them; or grooves may be formed in any other suitable manner. Even nails will do, if a sufficient number are used, but I consider them too expensive; and it will be found advisable to give the planks a thorough coating of tar before applying the composition.

The foundation may be prepared in various forms. As shown at B, I use joist or scantling of any desired size, which may be placed some distance apart and bridged, as shown by C. This foundation will be prepared in sections, as before described, and the interstices may be filled with broken stone, coarse gravel, or other coarse material, and the composition then applied, as before described.

At D another form of foundation is shown, in which I use two tiers of scantling or other suitable pieces of wood, the upper tier being placed transversely to the longitudinal tier E. These several pieces are placed some distance apart, and the interstices filled with broken stone, after which the composition is applied, The last form is adapted to walks which are to be laid on the ground; the other forms to those to be laid over excavated places.

When the walk is to be used on the ground, the foundation may be prepared wholly or in part with limbs and branches of trees, or with brush, and other similar material of little value.

The joints or plank or scantling may be secured, when used, as shown at B and D G, fastening a plank to the ends, and their upper edges may be bevelled or grooved. When plank or boards are secured to the joist or scantling, holes may be bored in the plank or boards, into which the composition will run and be securely anchored to the foundation. In the form shown at D, boards of any desired width may be used, which may be nailed together or not.

Before pouring in the composition, the foundation may be raised a trifle above the platform or other place on which it is placed for filling. The composition will then cover the bottom of the foundation, and every part of the wood will be perfectly covered and rendered as indestructible as the composition.

The frames placed around the sections before pouring in the composition should be washed with a clay solution, or some other suitable material, to prevent the adhesion of the composition to the frame. A composition of coal-tar and dry sand or clay and small gravel may be used, the same being thoroughly mixed while boiling, and being boiled till most of the volatile matter is driven off; or any other suitable composition can be used with my foundation. If escaping gases tend to form bunches after the composition has been poured, boards and weights can be laid thereon while it is cooling.

It will be obvious that frequently the foundation or filling can be laid in place, and there filled and covered with the composition, instead of being laid in sections previously completed, although I prefer constructing it in sections, as described.

My invention may be applied to numerous other uses, such as floors, cellar and cistern-linings, covering bridges, coping for brick walls, troughs, roadways, &c.

Having thus fully described my invention, what I claim as new, and desire to secure by Letters Patent, is—

1. The construction and arrangement of sidewalks or other ways with framework or supports of combined with and covered by a surface-coating composed of coal-tar, and grooved, substantially as specified.

2. The construction and arrangement of the walk in sections, substantially as described.

S. I. RUSSELL.

Witnesses:
   L. L. BOND,
   E. A. WEST.